(12) United States Patent
Marasco et al.

(10) Patent No.: US 11,541,969 B1
(45) Date of Patent: Jan. 3, 2023

(54) FLOATING HOLDER ATTACHABLE TO A BOAT

(71) Applicants: Anthony Marasco, Deerfield Beach, FL (US); Paul Marasco, Deerfield Beach, FL (US)

(72) Inventors: Anthony Marasco, Deerfield Beach, FL (US); Paul Marasco, Deerfield Beach, FL (US)

(*) Notice: Subject to any disclaimer, the term of this patent is extended or adjusted under 35 U.S.C. 154(b) by 108 days.

(21) Appl. No.: 17/239,622

(22) Filed: Apr. 25, 2021

(51) Int. Cl.
| | |
|---|---|
| *B63B 29/04* | (2006.01) |
| *B62B 1/12* | (2006.01) |
| *B62B 1/26* | (2006.01) |
| *B62B 5/06* | (2006.01) |

(52) U.S. Cl.
CPC ............ *B63B 29/04* (2013.01); *B62B 1/12* (2013.01); *B62B 1/26* (2013.01); *B62B 5/06* (2013.01); *B62B 2206/006* (2013.01)

(58) Field of Classification Search
CPC .. B63B 29/04; B62B 1/12; B62B 1/26; B62B 5/06; B62B 2206/006
See application file for complete search history.

(56) References Cited

U.S. PATENT DOCUMENTS

| | | |
|---|---|---|
| 8,371,548 B1 | 2/2013 | Bishop |
| 8,960,477 B1 | 2/2015 | Bishop |

*Primary Examiner* — Bryan A Evans
(74) *Attorney, Agent, or Firm* — Peter Loffler

(57) ABSTRACT

A holding device, capable of floating, is removably attachable to a gunwale of a boat or other object and is comprised of a basket member having a base frame for holding cargo. A vertically oriented vertical frame member extends upwardly from the base frame and together with a hook assembly, forms a variable width J-shaped hook to hook the device onto the boat. A pair of wheels is attached to the basket member with their distance relative to the base frame being variable. The wheels allow ground transport of the device and also to provide a support for a lower portion of the device against the side of the boat. The wheels also create a pair of flotation members should the device become dropped into the water. A height adjustable handle can be used to pull the device on the ground surface.

12 Claims, 6 Drawing Sheets

FLOATING HOLDER ATTACHABLE TO A BOAT

BACKGROUND OF THE INVENTION

1. Field of the Invention

The present invention relates to a holder for ice chests and similar items wherein the holder overhangs the side of a boat in order to save space on the boat while protecting the side of the boat from scuffs, wherein the holder has floatation capabilities if it enters the water.

2. Background of the Prior Art

Boating is a popular pastime enjoyed by many, especially considering the fact that most Americans live a short driving distance from a navigable body of water. When the weather is agreeable, just load up the boat with fishing gear or other toys, food, drinks, and other whatnots, and then launch the boat for a fun filled day on the water. Although reasonable in size for their intended purpose, most boats, nevertheless, tend to be relatively small. Many factors dictate the need to keep boats relatively small including the costs of the boat, the high fuel consumption of a boat, the need to be able to tow the boat to the launch site, and the need to store the boat, among others. While even a small boat can be quite fun and relaxing, certain tradeoffs must be made. With several people on board a relatively small boat, precious little real estate, both deck space and seating space, remains for other items such as bait holders, coolers, picnic baskets, etc, items which are considered essential for all but the shortest of boat rides. Placing such items onto the boat crowds the deck, makes it more difficult for the passengers to move around, and is a tripping hazard. While many boats have below deck storage areas, such storage areas are often difficult to access and require the passengers to crowd to one section of the boat, which can be quite uncomfortable, especially when the outside temperature is very hot.

What is needed is a device that allows boat captains to be able to take coolers and other items aboard a boat without sacrificing the relatively scarce deck space and seating areas aboard the boat. Such a device must allow quick and easy access to the items being held by the device without imposing an undue burden upon the boat's passengers. Ideally such a device should be of relatively simple design and construction and be easy to install, operate, and maintain.

SUMMARY OF THE INVENTION

The floating holder attachable to a boat of the present invention addresses the aforementioned needs in the art by providing a holder that is capable of holding typical coolers as well as various other items on board a boat without the need to take up any deck or seating real estate of the boat so as to not crowd the boat and so as to not act as a tripping hazard. The floating holder attachable to a boat allows for quick and easy access to the items being held therein without the need to herd the passengers to a particular section of the boat. In case of accidentally allowing the device to fall into the water, the floating holder attachable to a boat floats so that it can be easily retrieved. The floating holder attachable to a boat is of relatively simple design and construction so as to be relatively inexpensive to manufacture making the device economically affordable to a large portion of the boat owning consumers. The floating holder attachable to a boat is relatively easy to install upon the boat, is easy to operate, and to maintain. The floating holder attachable to a boat has additional versatility in that it can be attached to various other items such as the bed of a pickup truck, the top of a fence, and the back of a bench, among other locations The floating holder attachable to a boat of the present invention is comprised of a basket member that has a horizontally disposed base frame. The base frame has a front side and an opposing rear side joined by a first side and an opposing second side. A vertically disposed J-shaped hook member extends upwardly from the rear side of the base frame. The hook member has a main leg that attaches to base frame proximate the rear side of the base frame. The hook member also has a variable width base leg and a downwardly depending distal leg. A handle assembly is attached to the hook member. A railing has a first end and a second end such that the first end of the railing is attached to a first edge of the main leg of the hook member while the second end attached to an opposing second edge of the main leg of the hook member. At least one strut is attached to the railing and to the base frame in order to support the railing above the base frame. The handle assembly is telescoping so as to be positionable between a lowered or stowed position and a raised position for use in pulling the device about. A first strut has a first wheel rotatably located thereon and is slidably disposed within a first channel of the base frame and extends rearwardly from the rear side of the base frame. A second strut has a second wheel rotatably located thereon and is slidably disposed within a second channel of the base frame and extending rearwardly from the rear side of the base frame. The first channel and the second channel are located along the first side and the second side of the base frame respectively. The first wheel and the second wheel are each pneumatic, which means that they are either inflatable in appropriate fashion or have an interior filled with air and sealed so as to prevent water intrusion into the interior. A horizontally disposed tray is attached to the hook member.

BRIEF DESCRIPTION OF THE DRAWINGS

Similar reference numerals refer to similar parts throughout the several views of the drawings.

DESCRIPTION OF THE PREFERRED EMBODIMENT

Figure 1:
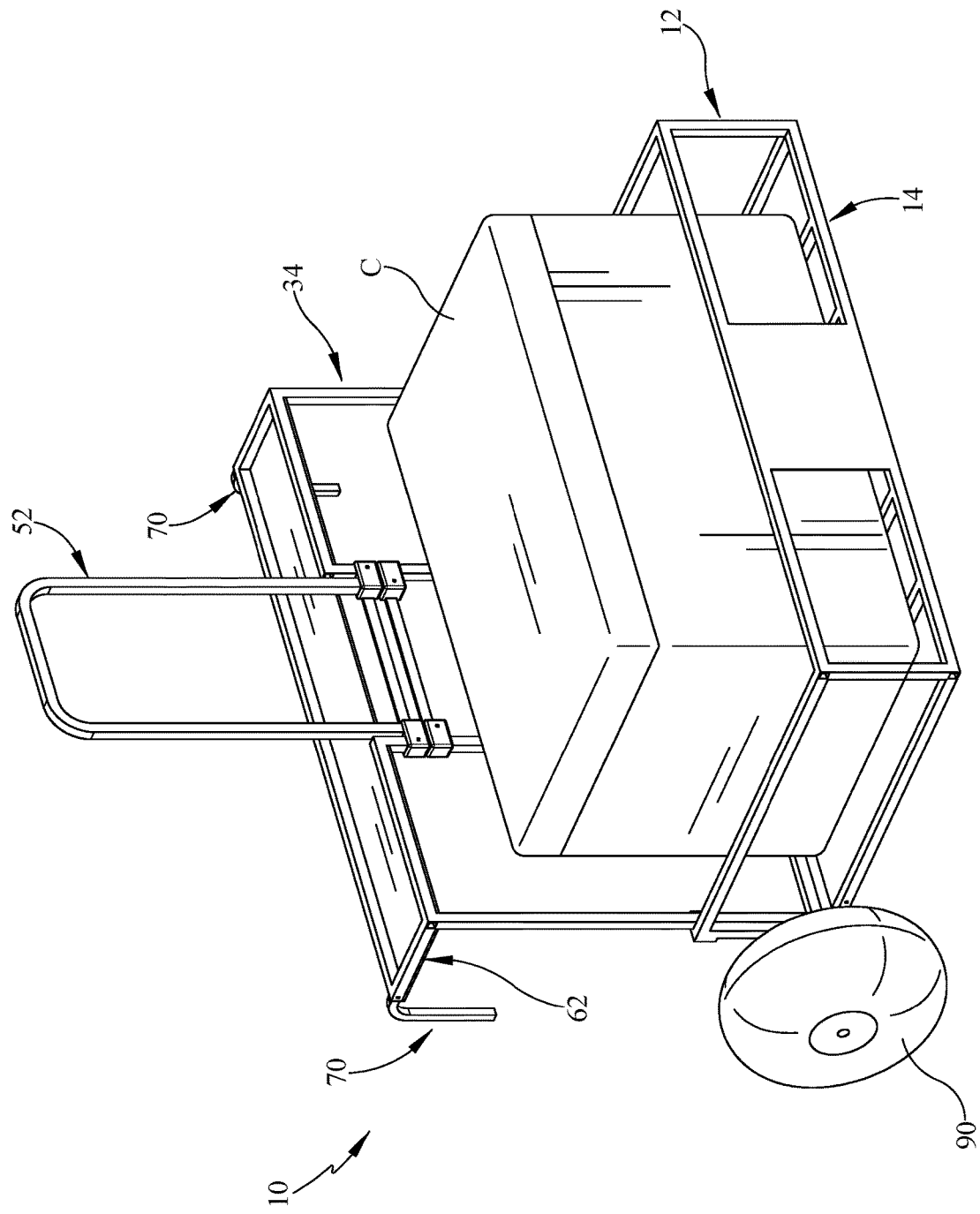
FIG. 1 is a perspective view of the floating holder attachable to a boat of the present invention holding a cooler.

Referring now to the drawings, it is seen that the floating holder attachable to a boat of the present invention, generally denoted by reference numeral 10, is comprised of a generally rectangular shaped basket member 12 (other shapes are of course possible) that has a base frame 14. The base frame 14 has a front leg 16, defining the front of the basket member 12, and a coextensive back leg 18, defining the back of the basket member 12, joined by a pair of coextensive side legs 20. A series of support struts 22 connect the front leg 16 and the back leg 18. A solid or mesh plate (neither illustrated) can be located atop the base frame 14. At least the two side legs 20 are hollow tubular members, however, for simplicity of construction all similar components may be hollow tubular members including those discussed infra. A series of vertical struts 24 extends upwardly from the base frame 14 at least at each corner of the base frame 14. As seen, a front connector 26 extends between the vertical struts 24 located at the front corners of the basket member 12, that is, the joinder area of the front leg 16 and each of the side legs 20 while a pair of coextensive side connectors 28 each extend between the vertical struts 24 located at the front corners of the basket member 12 and the vertical struts 24 located at the back corners of the basket member 12, that is, the joinder area of the back leg 18 and each of the side legs 20. The connectors 26 and 28 form a protective railing for the basket member 12 in order to help hold cargo C within the basket member 12. As seen, an inwardly directed lip 30 may be located on the end of each side connector 28. A plate 32 extends between the front connector 26 and the front leg 16.

A vertical frame 34 extends upwardly from base frame 14 and comprises a main leg 36 that sits atop the back leg 18 of the base frame 14. A pair of outer vertical stanchions 38 extends upwardly from main leg 36 and each outer vertical stanchion 38 is located at a back corner of the basket member 12 A pair of inner vertical stanchions 40 extends upwardly from the main leg 36 and are positioned between the pair of outer vertical stanchions 38. A stanchion connector 42 connects the top of each outer vertical stanchion 38 and its adjacent inner vertical stanchion 40. A horizontal groove 44 is disposed within a forward facing face of each inner vertical stanchion 40 just below the stanchion connector 42. An upper collar 46 is attached to each inner vertical stanchion 40 between the horizontal groove 44 and the stanchion connector 42, each upper collar 46 secured to its inner vertical stanchion 40 in appropriate fashion such as via the use of a screw 48. A strut collar connector 50 is attached to each of the upper collars 46 to add structural support.

Figure 2:
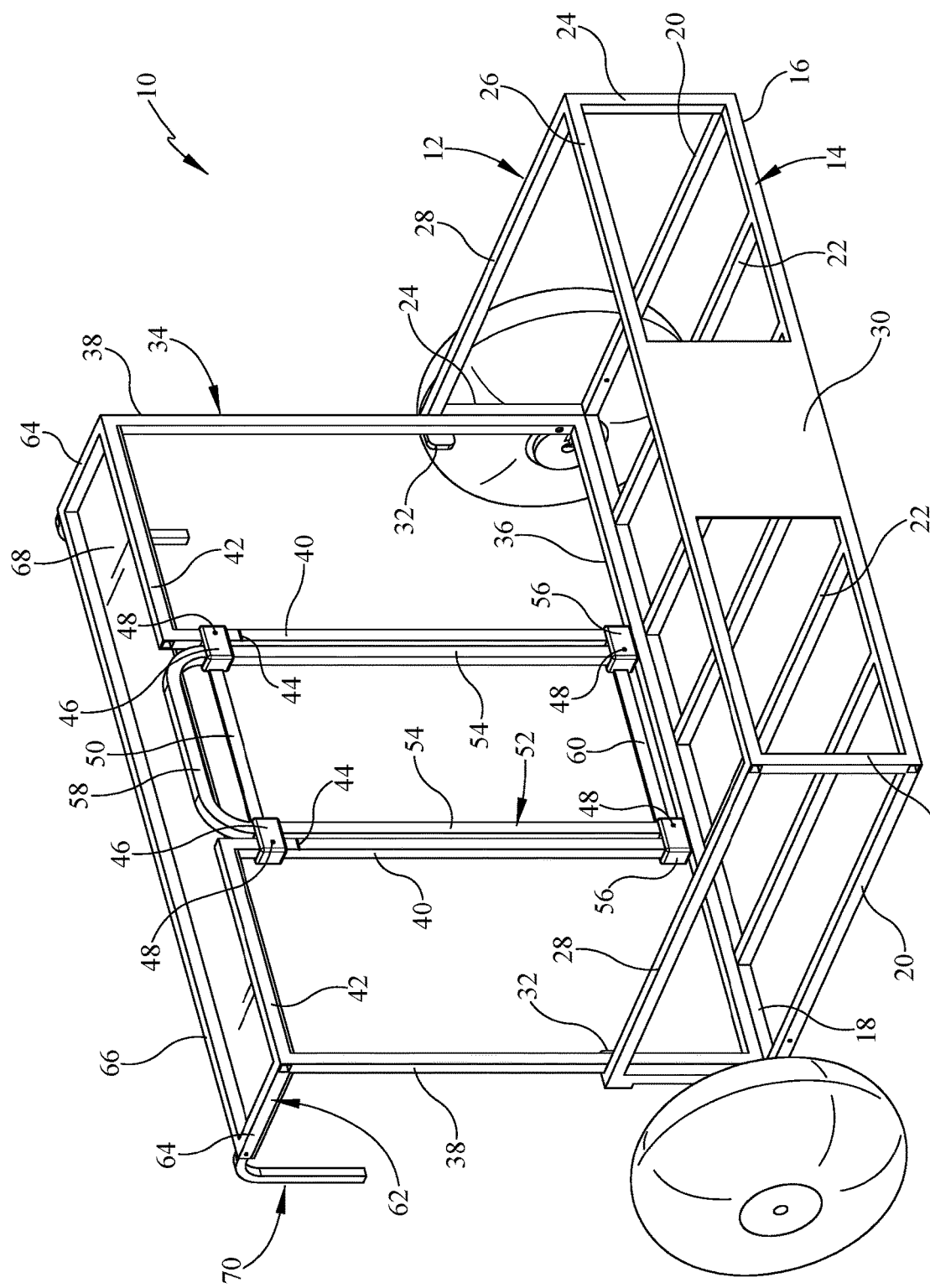
FIG. 2 is a perspective view of the floating holder attachable to a boat.
Figure 3:
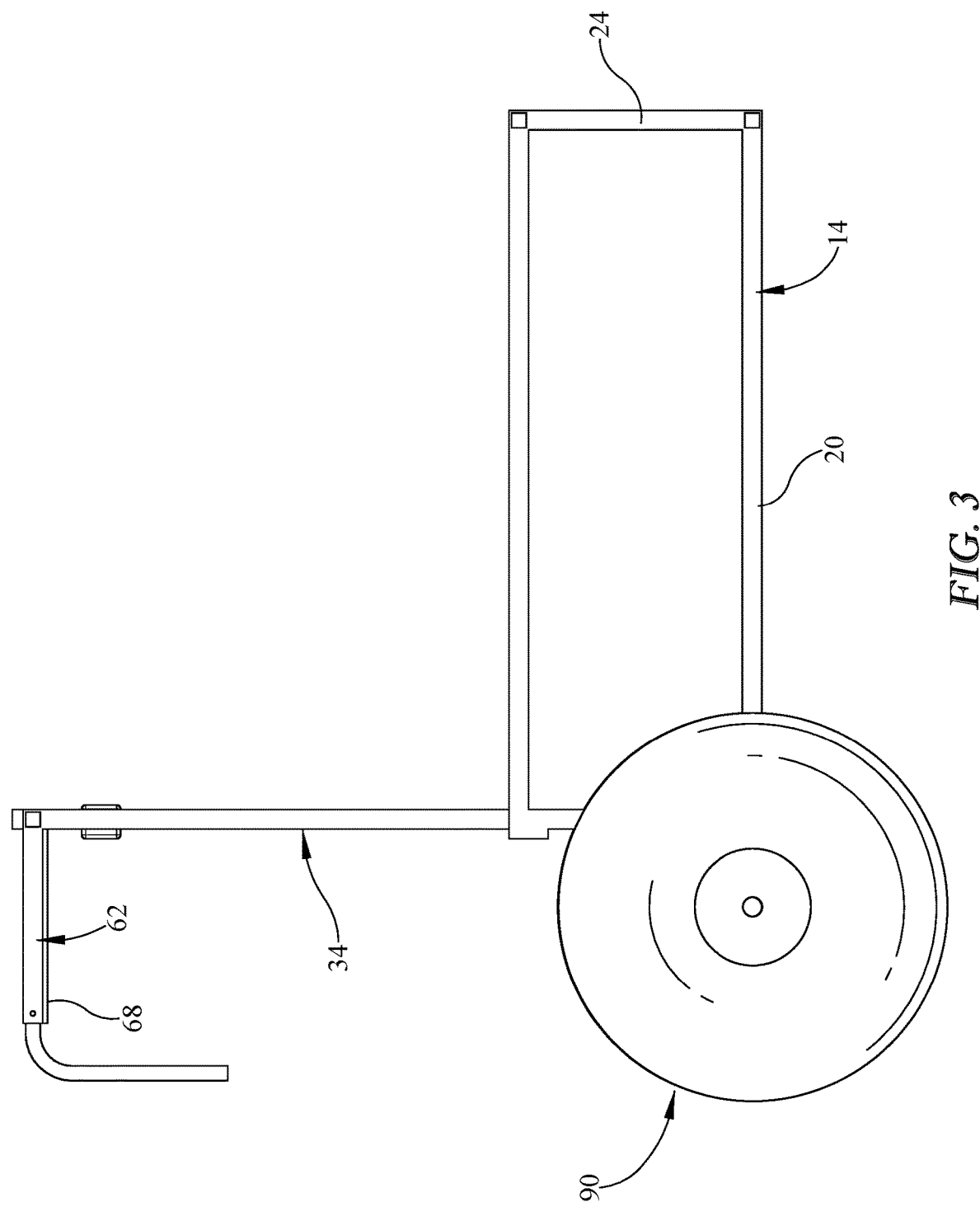
FIG. 3 is a side view of the floating holder attachable to a boat.
Figure 4:
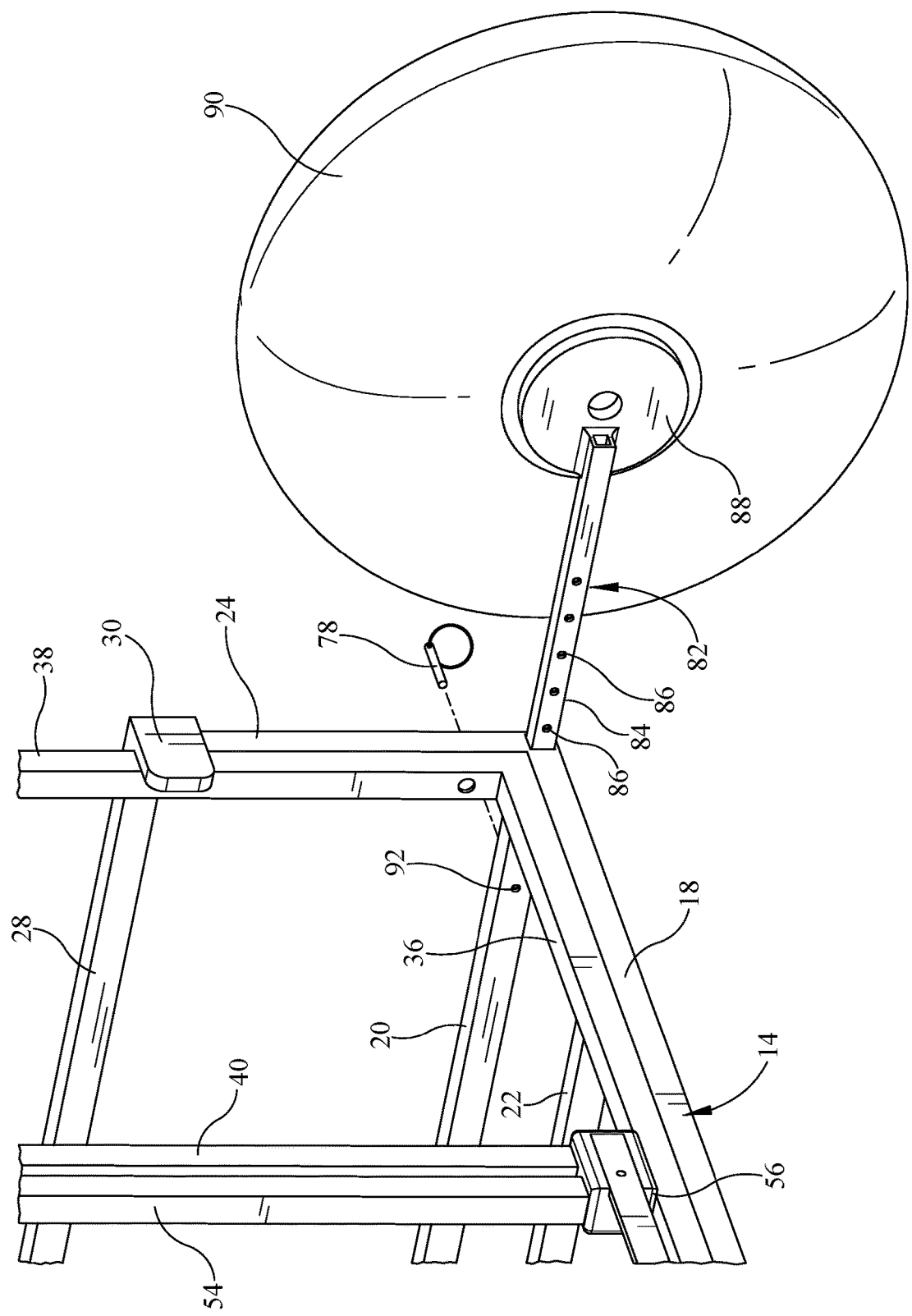
FIG. 4 a closeup perspective view of one of the wheels being attached to the basket member of the floating holder attachable to a boat.
Figure 5:
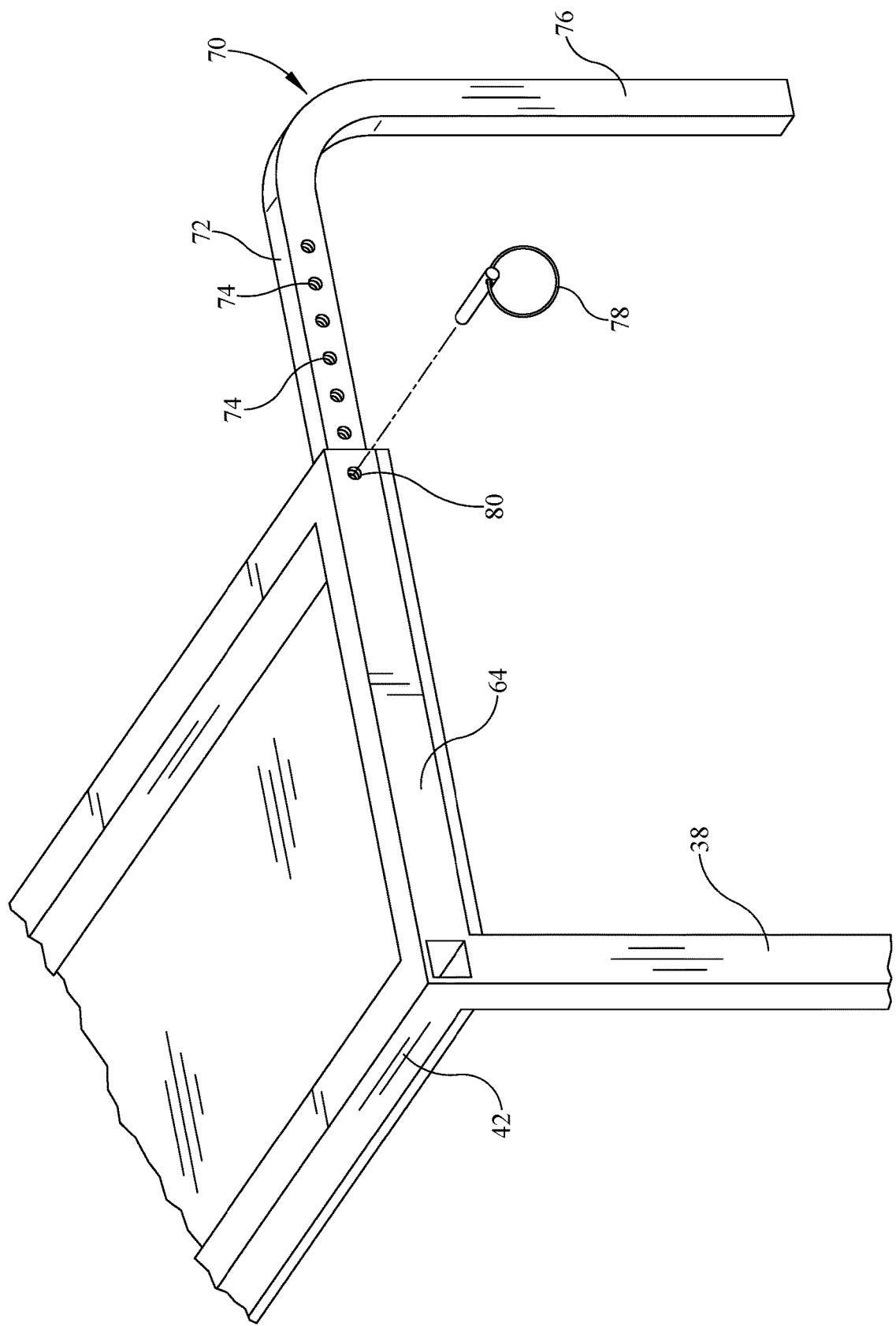
FIG. 5 a closeup perspective view of hook of the floating holder attachable to a boat being sized for a desired width.
Figure 6:
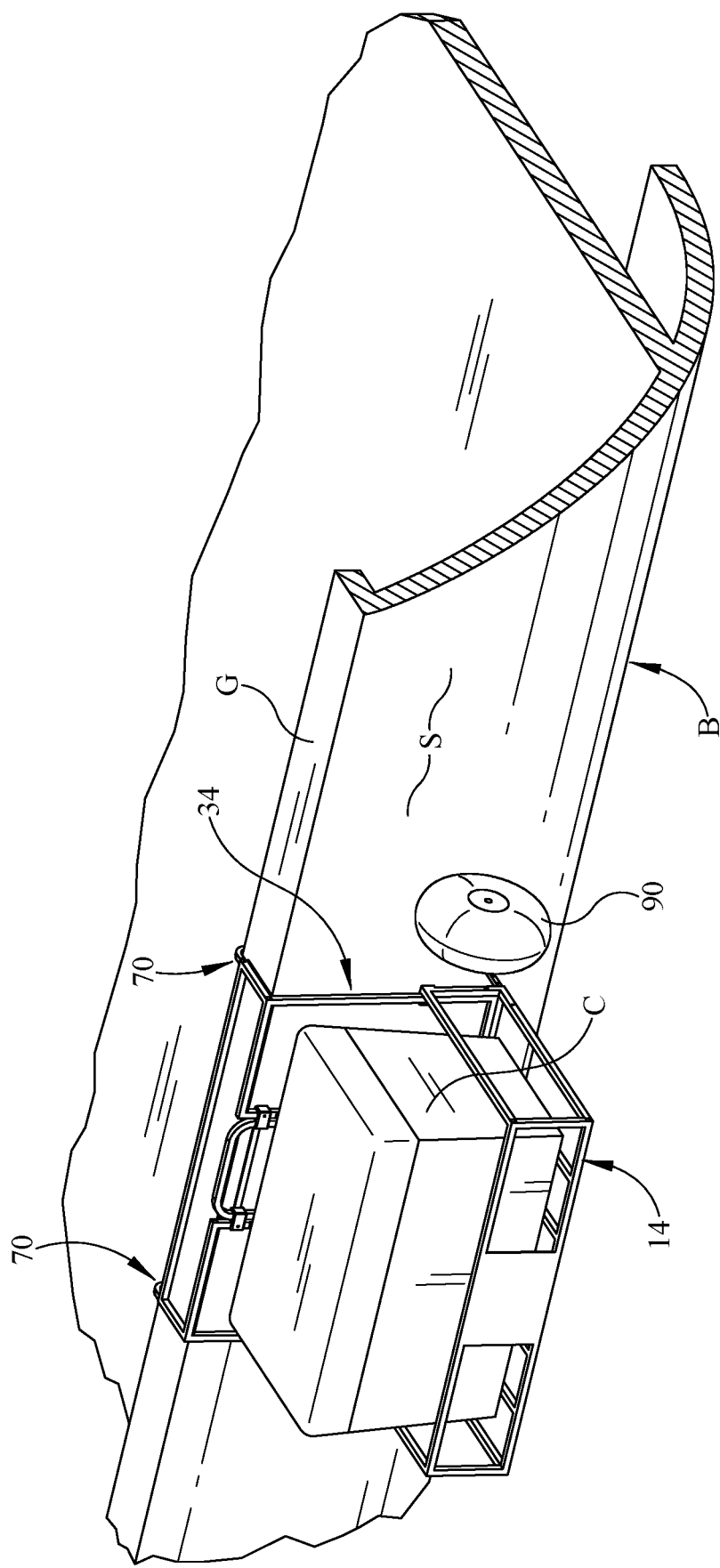
FIG. 6 is an environmental; view of the floating holder attachable to a boat attached to a side of a boat.

A telescoping handle assembly 52 uses a pair of coextensive handle rails 54 that each have a lower collar 56 attached to a lower end thereof in appropriate fashion such as via the use of a screw 48. A handle grip 58, which may be rounded and have padding (not illustrated) thereon, extends between the tops of the handle rails 54 to form a generally U-shaped handle. The handle rails 54 and the handle grip 58 may be formed as a single continuous unit. A handle collar connector 60 is attached to each of the lower collars 56. The handle assembly 52 is attached to the remainder of the floating holder attachable to a boat 10 by having each of the upper collars 46 encircle one of the handle rails 54 and each of the lower collars 56 encircle one of the inner vertical stanchions 40. As such, each handle rail 54 is able slide within its upper collar 46 while each lower collar 56 is able to slide along its inner vertical stanchion 40. Therefore, the handle assembly 52 is able to slide between a lowered position, as best seen in FIG. 2, and a raised position as best seen in FIG. 1. When the handle assembly 52 is in the raised position, each lower collar 56 frictionally engages the horizontal groove 44 on its inner vertical stanchion 40 in order to lock the handle assembly 52 in the raised position. In order to lower the handle assembly 52 back down to the lowered position, a user simply pushes down on the handle grip 58 in order to overcome the frictional engagement forces acting on the lower collars 56 by their respective horizontal groove 44. The upper collars 46 act as a stop to prevent the handle assembly 52 from being detached from the remainder of the floating holder attachable to a boat 10.

A hook assembly 62 extends rearwardly from the top of the vertical frame 34 and comprises a pair of rearwardly directed attachment tubes 64 that each extend from the joinder area of one of the outer vertical stanchions 38 and its stanchion connector 42. The attachment tubes 64 are hollow tubular members. A tray connector 66 extends between the distal ends of the attachment tubes 64. A tray 68, which is essentially a plate member and may be solid, as illustrated, or meshed, is disposed between the area defined by the stanchion connectors 42, the attachment tubes 64, and the tray connector 66 and is attached to each component in appropriate fashion. A pair of hooks 70 is provided and each has a horizontal leg 72 having a series of openings 74 thereon and a vertical leg 76. Each hook 70 is slidably disposed within a respective one of the attachment tubes 64. Each hook 70 is extended to a desired length with respect to the attachment tube 64 and is locked therein by passing a pin 78 through an opening 80 located in the attachment tube 64 and the opening 74 located on the horizontal leg 72 that aligns with the opening 80 on the attachment tube 64. Of course, other means can be employed to make the length of extension of the hook 70 variable and lockable such as via the use of spring-loaded buttons, etc. As seen, in combination with the vertical frame 34, the hook assembly 62 creates a variable width J-shaped hook member such that the vertical frame 34 forms the main leg of the J hook, the tubes 64 and the horizontal legs 72 of the hooks 70 form the telescoping base leg of the J hook, and the vertical legs 76 of the hooks 70 form the distal leg of the J hook.

A pair of wheel assemblies 82 is removably attached to the basket member 12. Each wheel assembly 82 comprises a wheel strut 84 that has a series of opening 86 thereon and a wheel hub 88 located on a distal end thereof. A wheel 90 is rotatably attached to the wheel hub 88. The wheel 90 is pneumatic so that it is inflatable or otherwise made from a lightweight material such as hollow plastic or rubber and its interior is filled with air and is water impervious. Each wheel assembly 82 is attached to the basket member 12 by sliding its wheel strut 84 into the rearwardly facing channel of one of the side legs 20 of the base frame 14. Once the wheel 90 of the wheel assembly 82 is in a desired position with respect to the basket member 12, the wheel assembly 82 is locked into place by passing a pin 78 through an opening 92 on the side leg 20 and the opening 86 located on the wheel strut 84 that aligns with the opening 92 on the side leg 20. Of course, other means can be employed to make the length of extension of the wheel assembly 82 variable and lockable such as via the use of spring-loaded buttons, etc.

The wheels can be attached directly to the basket member without the need to use a forward-facing strut, telescoping or otherwise or can be attached via an appropriate axle truck (neither attachment method illustrated).

The various components of the floating holder attachable to a boat 10 are made from an appropriate lightweight strong material such as aluminum, plastic, or some combination thereof and are attached to each other in appropriate fashion such as via welding, adhesion, bolts, screws, and nuts, or some combination, depending on the materials used. Some of the components may, where appropriate, be formed as a single unit and formed into shape to create the two or more components called out in this description.

In order to use the floating holder attachable to a boat 10 of the present invention, the device is loaded as desired and is attached to an appropriate mounting area such as to the gunwale G of a boat B. The hook assembly 62 is sized in order to accommodate the width of the attachment surface. Once in position, each wheel assembly 82 is extended to a desired length in order to have the wheel 90 press onto a side S of the boat B so that the floating holder attachable to a boat 10 is kept essentially level. The wheels 90 also help prevent scuffing of the boat's side S. Should the floating holder attachable to a boat 10 fall into the water at any time, the use of relatively large pneumatic wheels 90 within the wheel assembly 82 help the floating holder attachable to a boat 10 float even if an onboard cooler C is relatively heavy. This allows the device to be easily retrieved without the need to go diving. When the floating holder attachable to a boat 10 is on land, the device can be pulled about on the wheels 90 with the user using the handle assembly 52, in the raised position, to help pull the floating holder attachable to a boat 10 and its cargo C.

While the invention has been particularly shown and described with reference to an embodiment thereof, it will be appreciated by those skilled in the art that various changes in form and detail may be made without departing from the spirit and scope of the invention.

We claim:

1. A holding device comprising:
   a basket member having a horizontally disposed base frame, the base frame having a front side and an opposing rear side joined by a first side and an opposing second side;
   a vertically disposed J-shaped hook member extending upwardly from the rear side of the base frame, the hook member having a main leg that attaches to base frame proximate the rear side, the hook member also having a variable width base leg, and a downwardly depending distal leg; and
   a handle assembly attached to the hook member.

2. The holding device as in claim 1 further comprising:
   a railing having a first end and a second end, the first end of the railing attached to a first edge of the hook member and the second end attached to an opposing second edge of the hook member; and
   a strut attached to the railing and to the base frame.

3. The holding device as in claim 1 wherein the handle assembly is telescoping.

4. The holding device as in claim 1 further comprising:
   a first wheel rotatably attached to the basket member proximate the rear side and the first side of the base frame; and
   a second wheel rotatably attached to the basket member proximate the rear side and the second side of the base frame.

5. The holding device as in claim 4 wherein the first wheel and the second wheel are each pneumatic.

6. The holding device as in claim 1 further comprising:
   a first strut attached to the base frame proximate the rear side and the first side and extending rearwardly from the rear side;
   a first wheel rotatably attached to the first strut;
   a second strut attached to the base frame proximate the rear side and the second side and extending rearwardly from the rear side; and
   a second wheel rotatably attached to the second strut.

7. The holding device as in claim 6 wherein the first wheel and the second wheel are each pneumatic.

8. The holding device as in claim 6 wherein the distance between the first wheel and the rear side of the base frame and the distance between the second wheel and the rear side of the base frame are each variable.

9. The holding device as in claim 1 further comprising:
   a first strut having a first wheel rotatably located thereon, the first strut slidably disposed within a first channel of the base frame and extending rearwardly from the rear side of the base frame; and
   a second strut having a second wheel rotatably located thereon, the second strut slidably disposed within a second channel of the base frame and extending rearwardly from the rear side of the base frame.

10. The holding device as in claim 9 wherein the first wheel and the second wheel are each pneumatic.

11. The holding device as in claim 1 further comprising a horizontally disposed tray attached to the hook member.

12. The holding device as in claim 1 further comprising a horizontally disposed tray attached to a portion of the base leg of the hook member.

* * * * *